United States Patent
Henderson (10) Patent No.: US 11,041,359 B2
(45) Date of Patent: Jun. 22, 2021

(54) ECCENTRIC SEAT FOR FLAPPER VALVE

(71) Applicant: Halliburton Energy Services, Inc., Houston, TX (US)

(72) Inventor: William David Henderson, Grayson, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/382,871

(22) Filed: Apr. 12, 2019

(65) Prior Publication Data
US 2019/0345792 A1 Nov. 14, 2019

Related U.S. Application Data

(60) Provisional application No. 62/669,764, filed on May 10, 2018.

(51) Int. Cl.
*E21B 34/06* (2006.01)
*F16K 1/226* (2006.01)

(52) U.S. Cl.
CPC ............ *E21B 34/06* (2013.01); *F16K 1/2263* (2013.01); *E21B 2200/05* (2020.05)

(58) Field of Classification Search
CPC ........ E21B 34/00; E21B 34/02; E21B 34/025; E21B 34/06; E21B 34/08; E21B 34/14; E21B 2200/05; E21B 33/00
See application file for complete search history.

(56) References Cited

U.S. PATENT DOCUMENTS

| | | | |
|---|---|---|---|
| 4,457,376 A | 7/1984 | Carmody et al. | |
| 5,465,786 A * | 11/1995 | Akkerman | E21B 34/066 166/66.4 |
| 6,315,047 B1 | 11/2001 | Deaton et al. | |
| 7,363,980 B2 * | 4/2008 | Pringle | E21B 34/10 166/319 |
| 2015/0136404 A1 * | 5/2015 | Groesbeck | E21B 21/10 166/318 |
| 2016/0138368 A1 | 5/2016 | Girola | |

OTHER PUBLICATIONS https://www.glossary.oilfield.slb.com/en/Terms/a/annulus.aspx Accessed 2020 (Year: 2020).*
International Search Report and Written Opinion, PCT/US2019/027211, dated Aug. 2, 2019, ISA/KR, 11 pages.

* cited by examiner

*Primary Examiner* — David Carroll
(74) *Attorney, Agent, or Firm* — Haynes & Boone, LLP (57) ABSTRACT

A method and apparatus according to which a flow control device includes a housing and a flapper valve. The housing defines an internal passage in which the flapper valve extends. The flapper valve includes a seat and a flapper pivotably coupled to the seat. The seat includes an internal passage and an external surface. The internal passage of the seat extends along a longitudinal central axis that is offset from a longitudinal central axis along which the external surface of the seat extends and a longitudinal central axis along which the internal passage of the housing extends. This offset allows an internal annular recess of the housing to accommodate the flapper pivoting away from the longitudinal central axis of the internal passage of the seat by a distance of equal to or greater than a radius of the internal passage of the seat.

16 Claims, 7 Drawing Sheets

ECCENTRIC SEAT FOR FLAPPER VALVE

CROSS-REFERENCE TO RELATED APPLICATION

This application claims the benefit of the filing date of, and priority to, U.S. Patent Application No. 62/669,764, filed May 10, 2018, the entire disclosure of which is hereby incorporated herein by reference.

TECHNICAL FIELD

This application relates generally to flow control devices for use in oil and gas operations, and, more particularly, to an eccentric seat for a flapper valve.

BACKGROUND

A flapper valve may extend within a housing and include a flapper pivotably connected to a seat and configured to open and close to allow one-way fluid communication through an internal passage of the housing. The seat includes an internal passage that is coaxial with an external surface thereof. As a result, the internal passage of the seat is also coaxial with the internal passage of the housing. The housing includes an internal annular recess configured to accommodate the flapper of the flapper valve when the flapper is in an open configuration. However, because the inner and outer diameters of existing flapper valves are restricted depending on the application for which they are used, the internal annular recess is often unable to accommodate the flapper in a manner that permits the flapper to pivot away from the longitudinal central axis of the internal passage of the seat by a distance of equal to or greater than a radius of the internal passage of the seat. This deficiency of existing flapper valves prevents the passage of certain downhole tools therethrough. As a result, a pocket must be milled into the housing at the internal annular recess to accommodate further pivoting of the flapper away from the longitudinal axis of the internal passage of the seat. But the milled pocket reduces the pressure rating of the housing making it difficult or impossible to obtain high pressure ratings required for flapper valves to be used in certain applications (e.g., sand control applications). Moreover, the milled pocket increases cost due to the manufacturing of the pocket and the difficulty in properly orienting the flapper valve so that the flapper fits into the milled pocket. Therefore, what is needed is an apparatus, method, or system that addresses one or more of the foregoing issues, and/or one or more other issues.

DETAILED DESCRIPTION

Figure 1:
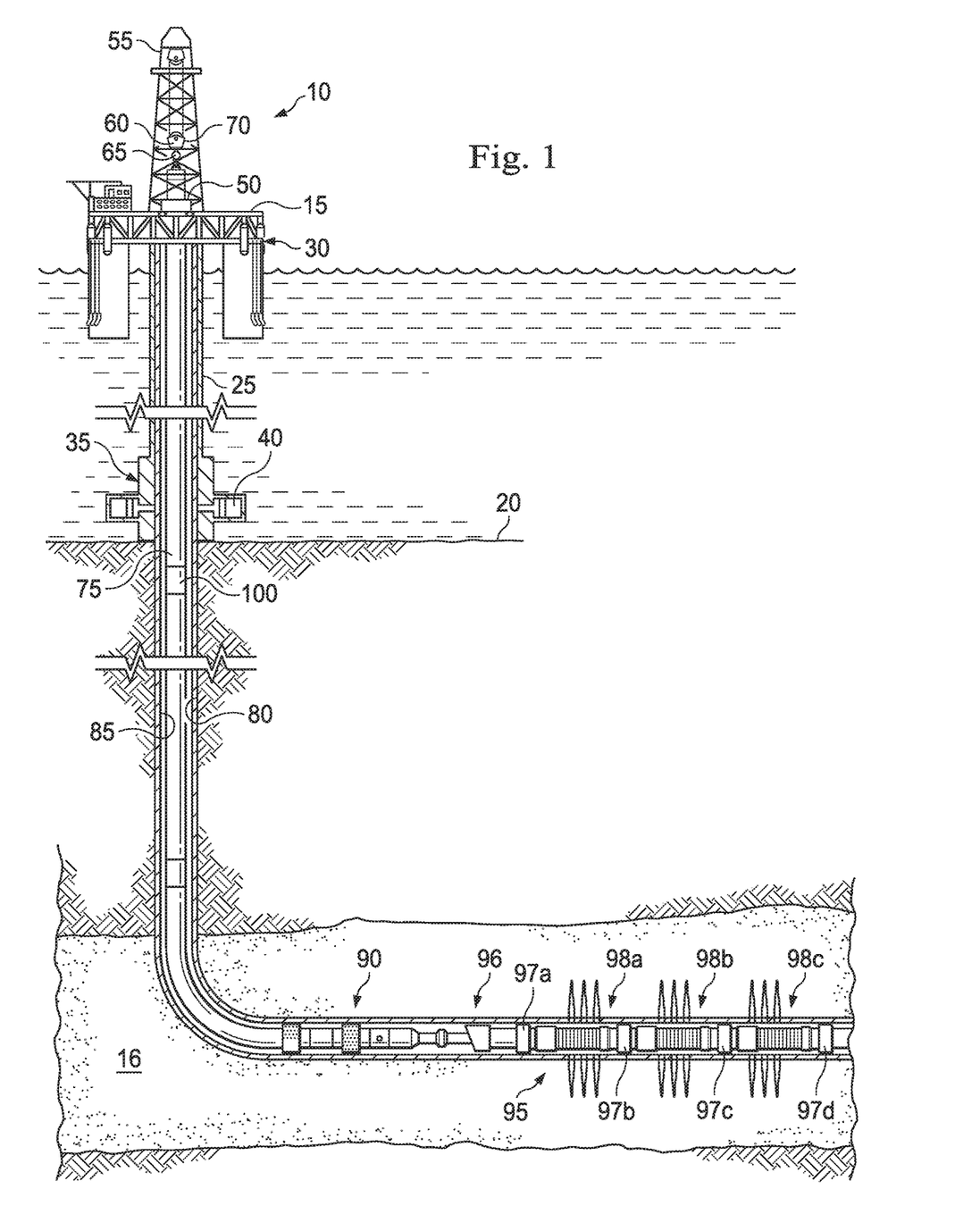
FIG. 1 is a schematic illustration of an offshore oil and gas platform operably coupled to a subsurface flow control device according to one or more embodiments of the present disclosure.

Referring to FIG. 1, in an embodiment, an offshore oil and gas rig is schematically illustrated and generally referred to by the reference numeral 10. In an embodiment, the offshore oil and gas rig 10 includes a semi-submersible platform 15 that is positioned over a submerged oil and gas formation 16 located below a sea floor 20. A subsea conduit 25 extends from a deck 30 of the platform 15 to a subsea wellhead installation 35. One or more pressure control devices 40, such as, for example, blowout preventers (BOPs), and/or other equipment associated with drilling or producing a wellbore may be provided at the subsea wellhead installation 35 or elsewhere in the system. The platform 15 may also include a hoisting apparatus 50, a derrick 55, a travel block 60, a hook 65, and a swivel 70, which components are together operable for raising and lowering a conveyance string 75. The conveyance string 75 may be, include, or be part of, for example, a casing, a drill string, a completion string, a work string, a pipe joint, coiled tubing, production tubing, other types of pipe or tubing strings, and/or other types of conveyance strings, such as wireline, slickline, and/or the like. The platform 15 may also include a kelly, a rotary table, a top drive unit, and/or other equipment associated with the rotation and/or translation of the conveyance string 75. A wellbore 80 extends from the subsea wellhead installation 35 and through the various earth strata, including the submerged oil and gas formation 16. In some embodiments, as in FIG. 1, at least a portion of the wellbore 80 includes a casing 85 cemented therein.

In some embodiments, as in FIG. 1, the conveyance string 75 is, includes, or is operably coupled to an upper completion assembly 90 installed within the wellbore 80, in which wellbore 80 a lower completion assembly 95 is disposed. In addition to, or instead of, the upper and lower completion assemblies 90 and 95, a single trip completion assembly that does not include separate upper and lower completion assemblies can be installed into the wellbore 80. The lower completion assembly 95 is disposed in a substantially horizontal portion of the wellbore 80 and includes a latch subassembly 96, packers 97*a-d*, and screen subassemblies 98*a-c*. The upper completion assembly 90 couples to the latch subassembly 96 to place the upper completion assembly 90 and the conveyance string 75 in communication with the lower completion assembly 95. In some embodiments, such as those in which the single trip completion assembly that does not include separate upper and lower completion assemblies is installed into the wellbore 80, the latch subassembly 96 can be omitted.

A flow control device 100 is incorporated into the conveyance string 75. In addition, or instead, the flow control device 100, or another flow control device substantially identical to the flow control device 100, can be incorporated into the conveyance string 75, the upper completion assembly 90, the lower completion assembly 95, or any combination thereof. For example, the flow control device 100 and/or another flow control device substantially identical to the flow control device 100 may be incorporated into the conveyance string 75 and/or the upper completion assembly 90 for multi-zone completions operations. For another example, the flow control device 100 and/or another flow control device substantially identical to the flow control device 100 may be incorporated into the lower completion assembly 95 for two- or three-zone completions operations. The flow control device 100 is closable to seal off the submerged oil and gas formation 16 from the semi-submersible platform 15 and/or the subsea wellhead installation 35. Accordingly, the flow control device 100 may be used to control fluid loss after a gravel packing operation. Although described herein as being incorporated into the conveyance string 75, the upper completion assembly 90, the lower completion assembly 95, or any combination thereof, the flow control device 100 may instead be incorporated into any other system such as for example, another oil and gas system, in which the various features of the flow control device 100 would be useful. Such systems into which the flow control device 100 can be incorporated include, but are not limited to, various oil and gas drilling, completion, and production systems.

Figure 2A:
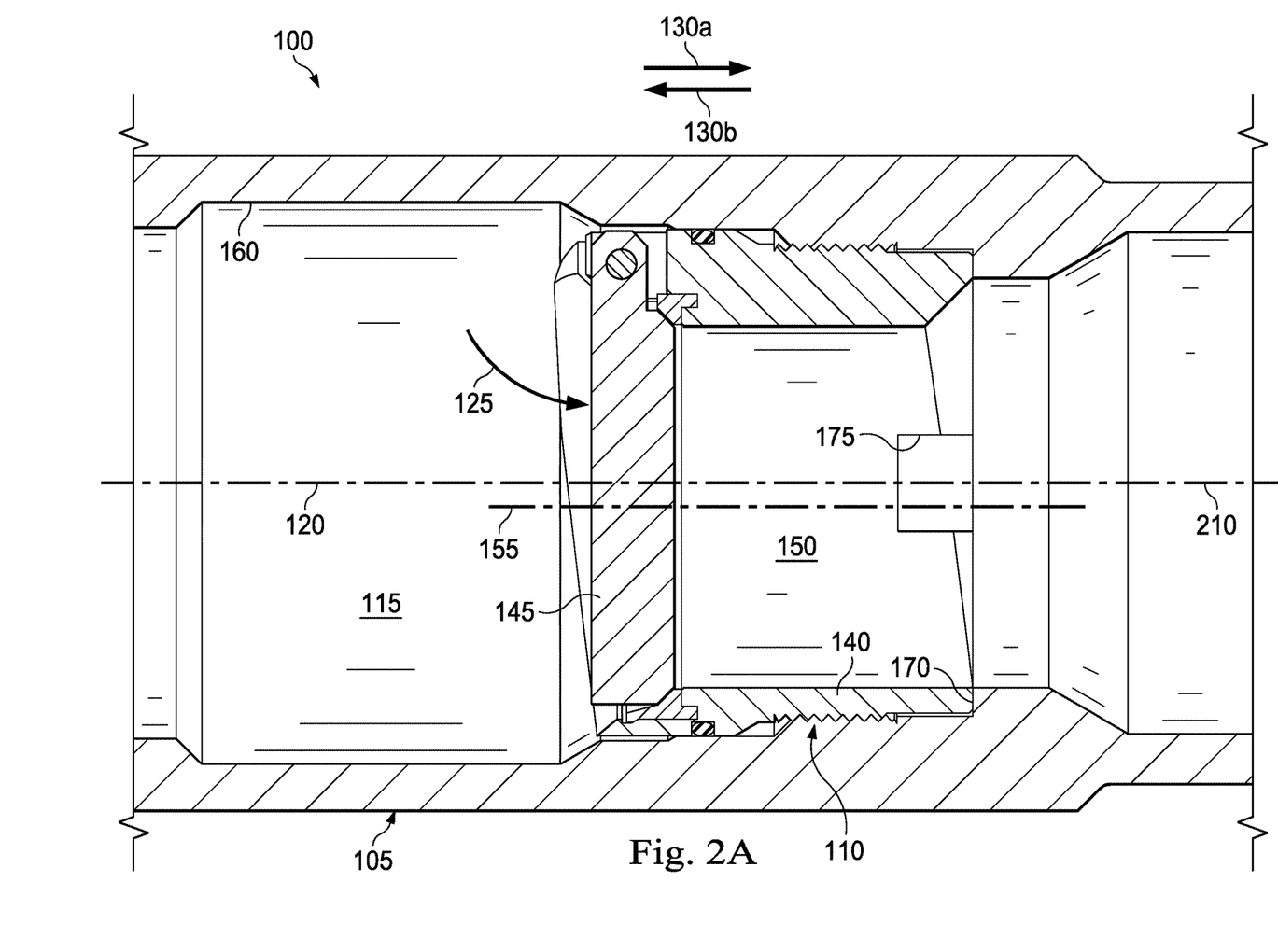
FIG. 2A is a cross-sectional view of the flow control device of FIG. 1 including a housing and a flapper valve, the flapper valve being shown in a closed configuration, according to one or more embodiments of the present disclosure.
Figure 2B:
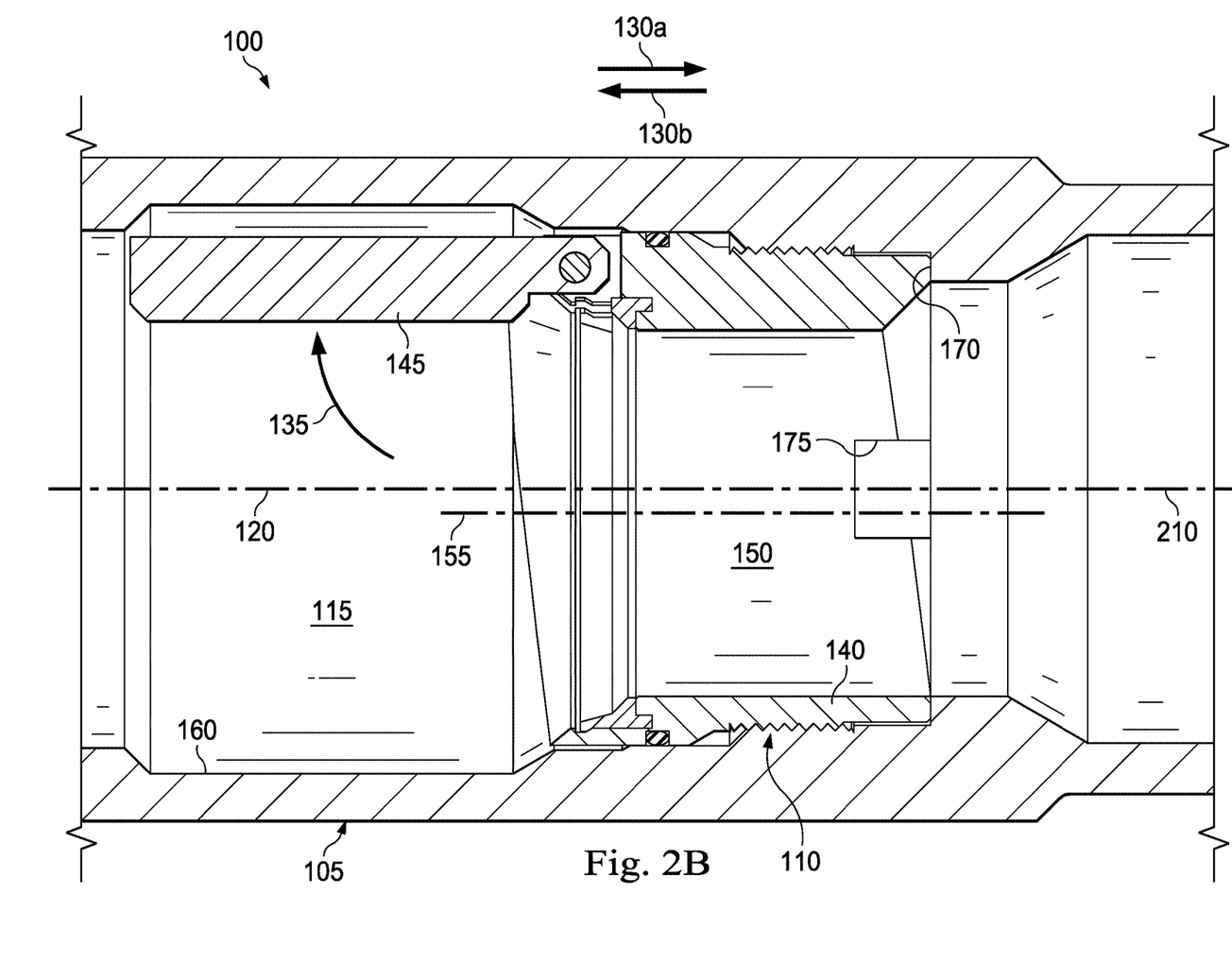
FIG. 2B is a cross-sectional view of the flow control device similar to that shown in FIG. 2A except that the flapper valve is shown in an open configuration, according to one or more embodiments of the present disclosure.

Referring to FIGS. 2A and 2B, in an embodiment, the flow control device includes a housing 105 and a flapper valve 110. The housing 105 defines an internal passage 115 extending along a longitudinal central axis 120. As shown in FIG. 2A, the flapper valve 110 extends within the internal passage 115 of the housing 105 and is actuable, as indicated by curvilinear arrow 125, to a closed configuration in which the flapper valve 110 prevents, or at least reduces, fluid flow through the internal passage 115 in a direction 130a (i.e., left to right as viewed in FIG. 2A). Moreover, as shown in FIG. 2B, the flapper valve 110 is actuable, as indicated by curvilinear arrow 135, to an open configuration in which the flapper valve 110 permits fluid flow through the internal passage 115 in a direction 130b (i.e., right to left as viewed in FIG. 2B), which is opposite the direction 130a.

The flapper valve 110 includes a seat 140 and a flapper 145. The seat 140 includes an internal passage 150 extending along a longitudinal central axis 155. The flapper 145 is pivotably coupled to the seat 140. The flapper 145 sealingly engages the seat 140 when the flapper valve 110 is in the closed configuration, as shown in FIG. 2A. In some embodiments, when the flapper valve 110 is in the closed configuration, the flapper 145 is spaced in a generally perpendicular relation with the longitudinal central axis 155 of the internal passage 150 of the seat 140. The flapper 145 is disengaged from the seat 140 when the flapper valve 110 is in the open configuration, as shown in FIG. 2B. In some embodiments, when the flapper valve 110 is in the open configuration, the flapper 145 is spaced in a generally non-perpendicular relation with the longitudinal central axis 155 of the internal passage 150 of the seat 140. In some embodiments, when the flapper valve 110 is in the open configuration, the flapper 145 is spaced in a generally parallel relation with the longitudinal central axis 155 of the internal passage 150 of the seat 140.

The housing 105 includes an internal annular recess 160 in which the flapper 145 of the flapper valve 110 extends when the flapper valve 110 is in the open configuration. The internal annular recess 160 of the housing 105 is coaxial with the longitudinal central axis 120 along which the internal passage 115 of the housing 105 extends. To permit passage of certain downhole tools through the flapper valve 110, the flapper 145 must be spaced apart from the longitudinal central axis 155 of the internal passage 150 of the seat 140 by a distance of equal to or greater than a radius R1 (shown in FIG. 3C) of the internal passage 150 of the seat 140 when the flapper valve 110 is in the open configuration.

The internal annular recess 160 of the housing 105 provides space for the flapper 145 to be spaced apart from the longitudinal central axis 155 of the internal passage 150 of the seat 140 by the distance of equal to or greater than the radius R1 (shown in FIG. 3C) so that the passage of certain downhole tools is permitted through the flapper valve 110 when the flapper valve 110 is in the open configuration. In addition, the flapper 145 is tapered at surfaces 165a and 165b (shown in FIG. 3A) to provide space for the flapper 145 to be spaced apart from the longitudinal central axis 155 of the internal passage 150 of the seat 140 by the distance of equal to or greater than the radius R1 (shown in FIG. 3C) so that the passage of certain downhole tools is permitted through the flapper valve 110 when the flapper valve 110 is in the open configuration. In several embodiments, the surfaces 165a and 165b are flat.

The housing 105 also includes an internal shoulder 170 adjacent which the seat 140 of the flapper valve 110 extends. In some embodiments, one or more notches 175 are formed in the seat 140. In some embodiments, an assembly tool (not shown) is configured to locate in the notches 175 to install the flapper valve 110 in the housing 105 by applying torque to the seat 140.

Figure 3A:
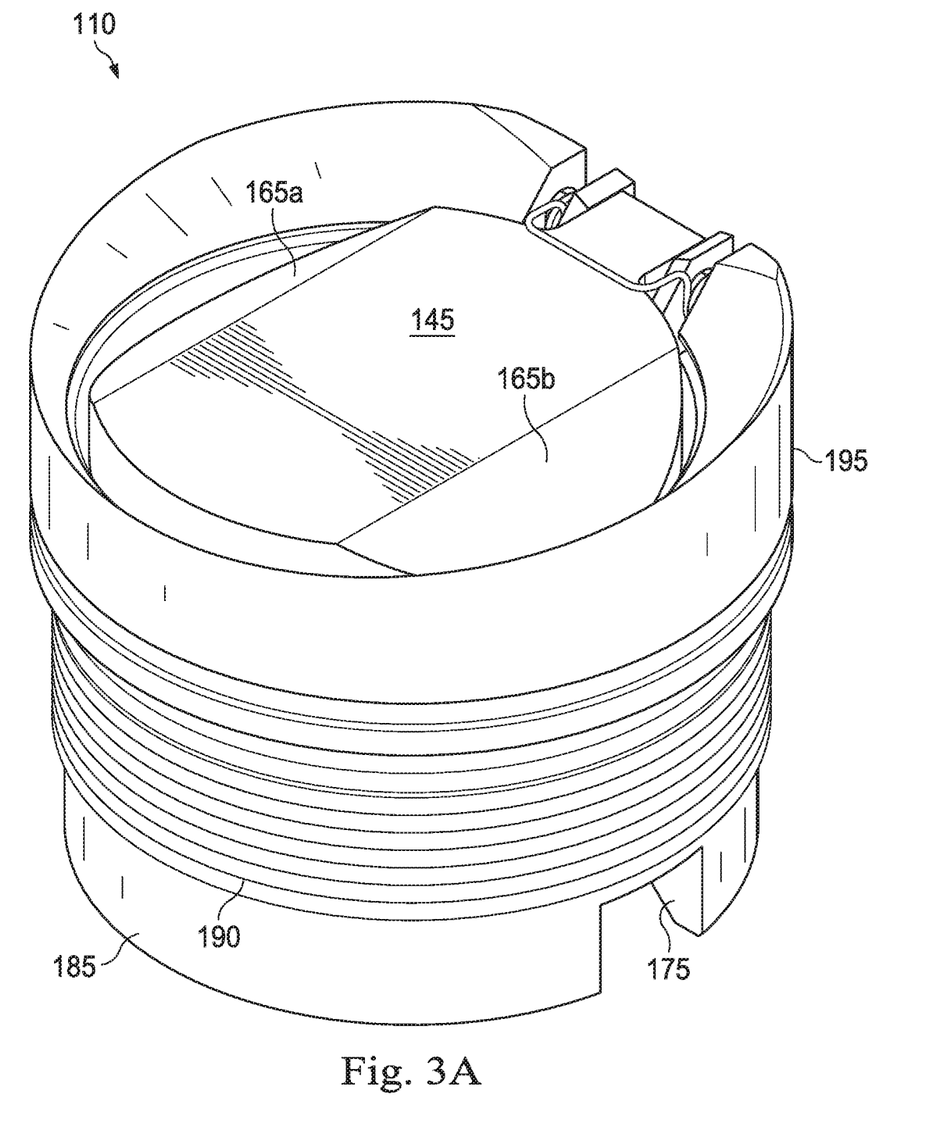
FIG. 3A is a perspective view of the flapper valve of FIGS. 2A and 2B in the closed configuration, according to one or more embodiments of the present disclosure.
Figure 3B:
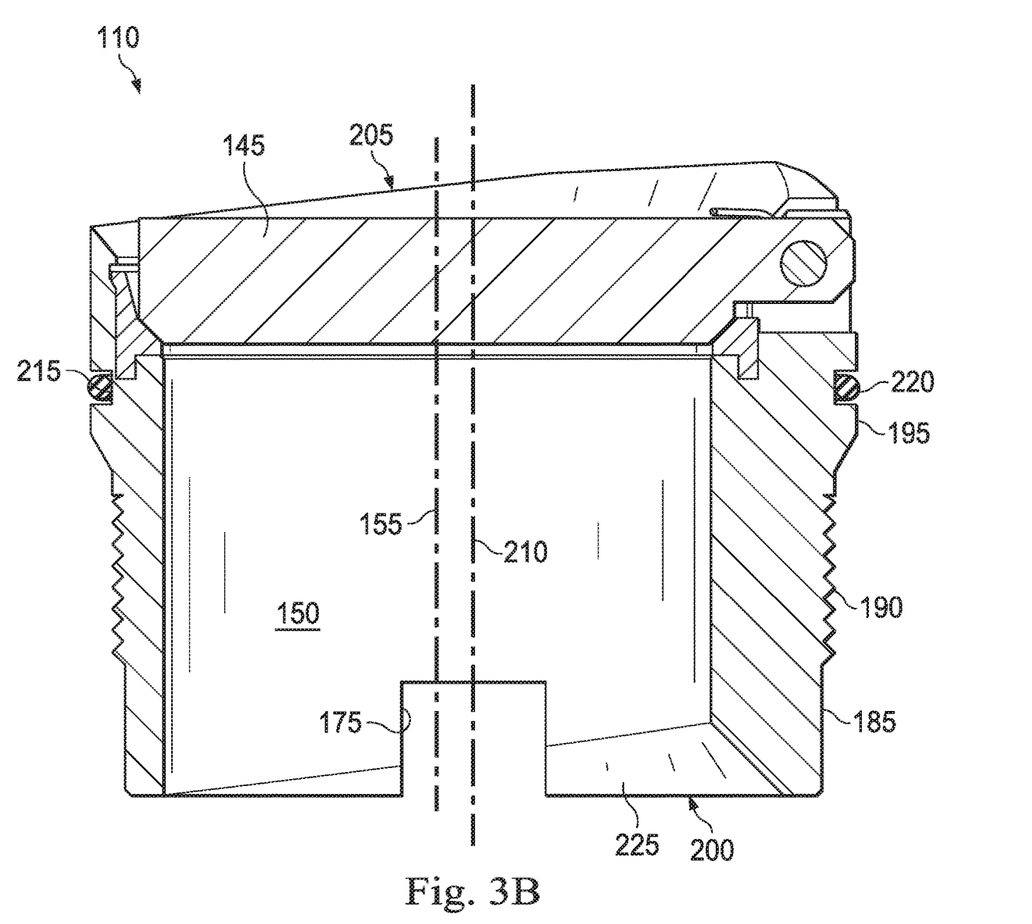
FIG. 3B is a cross-sectional view of the flapper valve of FIG. 3A taken along the line 3B-3B of FIG. 3A, according to one or more embodiments of the present disclosure.
Figure 3C:
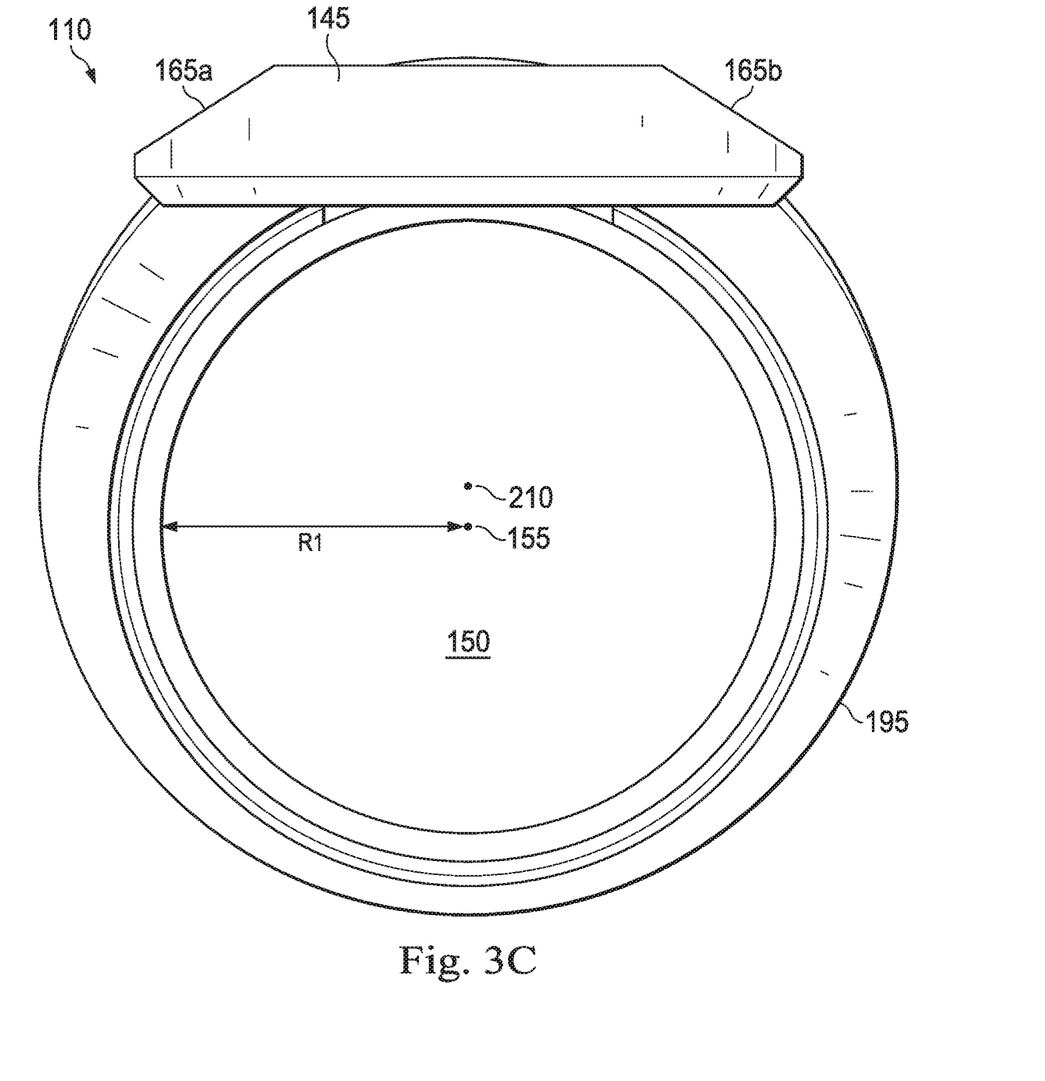
FIG. 3C is a top plan view of the flapper valve of FIGS. 2A and 2B in the open configuration, according to one or more embodiments of the present disclosure.

In an embodiment, as illustrated in FIGS. 3A-3C with continuing reference to FIGS. 2A and 2B, the seat 140 of the flapper valve 110 includes a reduced-diameter external surface 185, an intermediate-diameter external surface 190, and an enlarged-diameter external surface 195. As shown in FIGS. 3A and 3B, the reduced-diameter external surface 185 of the seat 140 is located at an end portion 200 of the seat 140 opposite the flapper 145. The enlarged-diameter external surface 195 of the seat 140 is located at an end portion 205 of the seat 140 adjacent the flapper 145. The intermediate-diameter external surface 190 of the seat 140 is located between the reduced-diameter external surface 185 of the seat 140 and the enlarged-diameter external surface 195 of the seat 140. Moreover, in some embodiments, the seat 140 of the flapper valve 110 includes one or more additional external surfaces in addition to, or instead of, the reduced-diameter external surface 185, the intermediate-diameter external surface 190, and the enlarged-diameter external surface 195. As shown in FIG. 3B, at least one of the external surfaces of the seat 140 extends along a longitudinal central axis 210. The seat 140 of the flapper valve 110 includes an external annular groove 215 formed in the enlarged-diameter external surface 195 and configured to accommodate an annular seal 220, which annular seal 220 is configured to sealingly engage the housing 105. The seat 140 also includes an internal tapered surface 225 configured to guide certain downhole tools into the internal passage 150 of the seat 140 of the flapper valve 110. In some embodiments, the internal tapered surface 225 is a frustoconical surface that is coaxial with the longitudinal central axis 210 along which the at least one of the external surfaces of the seat 140 extends.

In some embodiments, the longitudinal central axis 155 along which the internal passage 150 of the seat 140 extends is offset from the longitudinal central axis 210 along which the at least one of the external surfaces of the seat 140 extends. That is, the longitudinal central axis 155 along which the internal passage 150 of the seat 140 extends is not coaxial with the longitudinal central axis 210 along which the at least one of the external surfaces of the seat 140 extends. The offset of the longitudinal central axis 155 along which the internal passage 150 of the seat 140 extends from the longitudinal central axis 210 along which the at least one of the external surfaces of the seat 140 extends varies a wall thickness of the seat 140 of the flapper valve 110 along a circumference of the flapper valve 110. In some embodiments, the offset of the longitudinal central axis 155 along which the internal passage 150 of the seat 140 extends from the longitudinal central axis 210 along which the at least one of the external surfaces of the seat 140 extends also offsets the longitudinal central axis 155 along which the internal passage 150 of the seat 140 extends from the longitudinal central axis 120 along which the internal passage 115 of the housing 105 extends.

Figure 4:
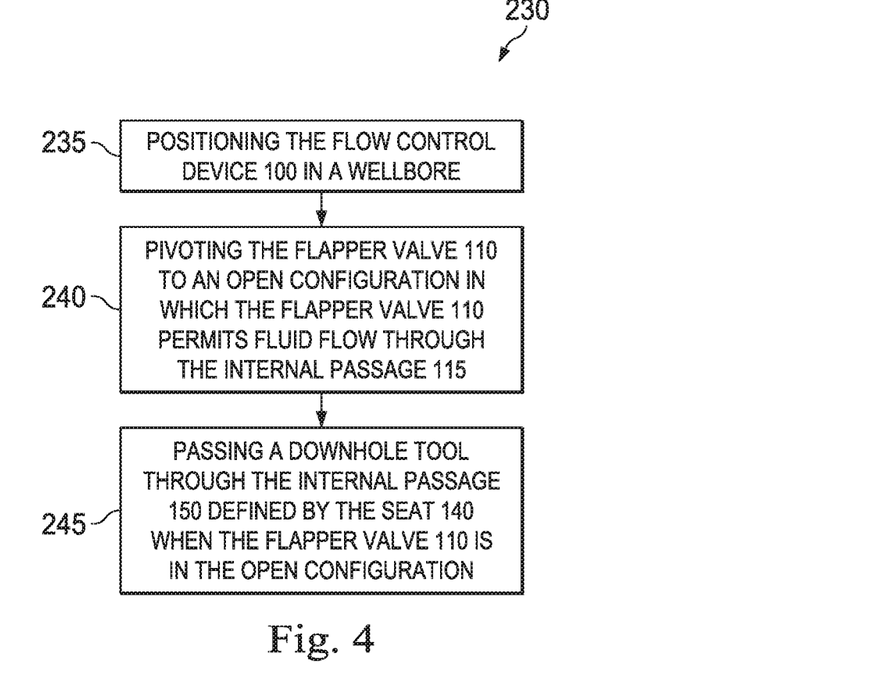
FIG. 4 is a is a flow diagram of a method for implementing one or more embodiments of the present disclosure.

Referring to FIG. 4 with continuing reference to FIGS. 2A, 2B, 3A, 3B, and 3C, a method of operating the flow control device 100 is generally referred to by the reference numeral 230. The method 230 includes at a step 235, positioning the flow control device 100 in a wellbore. The flow control device 100 includes the housing 105 and the flapper valve 110, the housing 105 defining the internal passage 115 extending along the longitudinal central axis 120, the flapper valve 110 extending within the internal passage 115 and including the seat 140 and the flapper 145. At a step 240, the flapper valve 110 is pivoted to an open configuration in which the flapper valve 110 permits fluid flow through the internal passage 115. In several embodiments, the flapper 145 is adapted to be spaced in a generally parallel relation with the longitudinal central axes 120, 155, and 210 when the flapper valve 110 is in the open configuration. In several embodiments, the flapper 145 is adapted to be pivoted away from the longitudinal central axis 155 by a distance of equal to or greater than the radius R1 of the internal passage 150 when the flapper valve 110 is in the open configuration. In several embodiments, the housing 105 includes the internal annular recess 160 in which the flapper 145 extends when the flapper valve 110 is in the open configuration, the internal annular recess 160 being coaxial with the longitudinal central axis 120, and the internal annular recess 160 providing space for the flapper 145 to be pivoted away from the longitudinal central axis 155 by the distance of equal to or greater than the radius R1 of the internal passage 150. In several embodiments, the flapper 145 includes one or more of the tapered surfaces 165a and 165b, and the one or more of the tapered surfaces 165a and 165b provide space for the flapper 145 to be pivoted away from the longitudinal central axis 155 by the distance of equal to or greater than the radius R1 of the internal passage 150.

At a step 245, a downhole tool is passed through the internal passage 150 defined by the seat 140 when the flapper valve 110 is in the open configuration. The internal passage 150 extends along the longitudinal central axis 155. The seat 140 includes one or more external surfaces (e.g., 185, 190, 195, etc.). At least one of the one or more external surfaces extends along the longitudinal central axis 210. The longitudinal central axis 155 is offset from the longitudinal central axis 120 and/or the longitudinal central axis 210. In several embodiments, the offset of the longitudinal central axis 155 from the longitudinal central axis 120 and/or the longitudinal central axis 210 provides space for the flapper 145 to be pivoted away from the longitudinal central axis 155 by the distance of equal to or greater than the radius R1 of the internal passage 150. In several embodiments, when the flapper 145 is pivoted away from the longitudinal central axis 155 by the distance of equal to or greater than the radius R1 of the internal passage 150, movement of the downhole tool through the flapper valve 110 is permitted.

In various embodiments, the offset of the longitudinal central axis 155 along which the internal passage 150 of the seat 140 extends from the longitudinal central axis 210 along which the at least one of the external surfaces of the seat 140 extends: allows the internal annular recess 160 of the housing 105 to accommodate the flapper 145 pivoting away from the longitudinal central axis 155 of the internal passage 150 of the seat 140 by a distance of equal to or greater than the radius R1 (shown in FIG. 3C) of the internal passage 150 of the seat 140; eliminates the need for an additional milled pocket (often associated with existing flapper valves) in the housing 105 to accommodate the flapper 145. In some embodiments, the offset of the longitudinal central axis 155 along which the internal passage 150 of the seat 140 extends from the longitudinal central axis 210 along which the at least one of the external surfaces of the seat 140 extends decreases the cost associated with milling an additional pocket (often associated with existing flapper valves) in the housing 105 to accommodate the flapper 145; and/or increases the pressure rating of the flapper valve 110 as compared to existing flapper valves needing milled pockets to accommodate the flapper.

Likewise, in various embodiments, the offset of the longitudinal central axis 155 along which the internal passage 150 of the seat 140 extends from the longitudinal central axis 120 along which the internal passage 115 of the housing 105 extends: allows the internal annular recess 160 of the housing 105 to accommodate the flapper 145 pivoting away from the longitudinal central axis 155 of the internal passage 150 of the seat 140 by a distance of equal to or greater than the radius R1 (shown in FIG. 3C) of the internal passage 150 of the seat 140; eliminates the need for an additional milled pocket (often associated with existing flapper valves) in the housing 105 to accommodate the flapper 145; decreases the cost associated with milling an additional pocket (often associated with existing flapper valves) in the housing 105 to accommodate the flapper 145; and/or increases the pressure rating of the flapper valve 110 as compared to existing flapper valves needing milled pockets to accommodate the flapper.

A flow control device has been disclosed. The flow control device generally includes a housing and a flapper valve, the housing defining a first internal passage extending along a first longitudinal central axis, the flapper valve extending within the first internal passage and including a seat and a flapper, the seat defining a second internal passage extending along a second longitudinal central axis, and the flapper being pivotably coupled to the seat, wherein the seat includes one or more external surfaces, wherein at least one of the one or more external surfaces extends along a third longitudinal central axis, and wherein the second longitudinal central axis is offset from the first longitudinal central axis and/or the third longitudinal central axis.

The foregoing flow control device embodiment may include one or more of the following elements, either alone or in combination with one another:

The flapper valve is actuable between: a closed configuration, in which the flapper valve prevents, or at least reduces, fluid flow through the first internal passage; and an open configuration, in which the flapper valve permits fluid flow through the first internal passage.

The flapper is adapted to be spaced in a generally parallel relation with the first, second, and third longitudinal central axes when the flapper valve is in the open configuration.

The flapper is adapted to pivot away from the second longitudinal central axis by a distance of equal to or greater than a radius of the second internal passage when the flapper valve is in the open configuration, and, when the flapper is pivoted away from the second longitudinal central axis by the distance of equal to or greater than the radius of the second internal passage, movement of certain downhole tools through the flapper valve is permitted.

The offset of the second longitudinal central axis from the first longitudinal central axis and/or the third longitudinal central axis provides space for the flapper to be pivoted away from the second longitudinal central axis by the distance of equal to or greater than the radius of the second internal passage.

The housing includes an internal annular recess in which the flapper extends when the flapper valve is in the open configuration, the internal annular recess being coaxial with the first longitudinal central axis, and the internal annular recess providing space for the flapper to be pivoted away from the second longitudinal central axis by the distance of equal to or greater than the radius of the second internal passage.

The flapper includes one or more tapered surfaces, and the one or more tapered surfaces provide space for the flapper to be pivoted away from the second longitudinal central axis by the distance of equal to or greater than the radius of the second internal passage.

One or more notches are formed in the seat and one or more internal protrusions are formed in the housing, wherein the one or more internal protrusions formed in the housing are configured to matingly engage the one or more notches formed in the seat to prevent, or at least reduce, rotation of the seat within the first internal passage; and/or one or more notches are formed in the housing and one or more internal protrusions are formed in the seat, wherein the one or more internal protrusions formed in the seat being configured to matingly engage the one or more notches formed in the housing to prevent, or at least reduce, rotation of the seat within the first internal passage.

A method has also been disclosed. The method generally includes: positioning a flow control device in a wellbore, the flow control device including a housing and a flapper valve, the housing defining a first internal passage extending along a first longitudinal central axis, the flapper valve extending within the first internal passage and including a seat and a flapper; pivoting the flapper valve to an open configuration in which the flapper valve permits fluid flow through the first internal passage; and passing a downhole tool through a second internal passage defined by the seat when the flapper valve is in the open configuration, wherein the second internal passage extends along a second longitudinal central axis, wherein the seat includes one or more external surfaces, wherein at least one of the one or more external surfaces extends along a third longitudinal central axis, and wherein the second longitudinal central axis is offset from the first longitudinal central axis and/or the third longitudinal central axis.

The foregoing method embodiment may include one or more of the following elements, either alone or in combination with one another:

The flapper is adapted to be spaced in a generally parallel relation with the first, second, and third longitudinal central axes when the flapper valve is in the open configuration.

The flapper is adapted to be pivoted away from the second longitudinal central axis by a distance of equal to or greater than a radius of the second internal passage when the flapper valve is in the open configuration, and, when the flapper is pivoted away from the second longitudinal central axis by the distance of equal to or greater than the radius of the second internal passage, movement of the downhole tool through the flapper valve is permitted.

The offset of the second longitudinal central axis from the first longitudinal central axis and/or the third longitudinal central axis provides space for the flapper to be pivoted away from the second longitudinal central axis by the distance of equal to or greater than the radius of the second internal passage.

The housing includes an internal annular recess in which the flapper extends when the flapper valve is in the open configuration, the internal annular recess being coaxial with the first longitudinal central axis, and the internal annular recess providing space for the flapper to be pivoted away from the second longitudinal central axis by the distance of equal to or greater than the radius of the second internal passage.

The flapper includes one or more tapered surfaces, and the one or more tapered surfaces provide space for the flapper to be pivoted away from the second longitudinal central axis by the distance of equal to or greater than the radius of the second internal passage.

A flapper valve has also been disclosed. The flapper valve generally includes a seat and a flapper, the seat defining an internal passage extending along a first longitudinal central axis, and the flapper being pivotably coupled to the seat, wherein the seat includes one or more external surfaces, wherein at least one of the one or more external surfaces extends along a second longitudinal central axis, and wherein the second longitudinal central axis is offset from the first longitudinal central axis.

The foregoing flapper valve embodiment may include one or more of the following elements, either alone or in combination with one another:

The flapper valve is actuable between: a closed configuration, in which the flapper valve prevents, or at least reduces, fluid flow through the internal passage; and an open configuration, in which the flapper valve permits fluid flow through the internal passage.

The flapper is adapted to be spaced in a generally parallel relation with the first and second longitudinal central axes when the flapper valve is in the open configuration.

The flapper is adapted to be pivoted away from the first longitudinal central axis by a distance of equal to or greater than a radius of the internal passage when the flapper valve is in the open configuration, and, when the flapper is pivoted away from the first longitudinal central axis by the distance of equal to or greater than the radius of the internal passage, movement of certain downhole tools through the flapper valve is permitted.

The offset of the first longitudinal central axis from the second longitudinal central axis provides space for the flapper to be pivoted away from the first longitudinal central axis by the distance of equal to or greater than the radius of the internal passage.

The flapper includes one or more tapered surfaces, and the one or more tapered surfaces provide space for the flapper to be pivoted away from the first longitudinal central axis by the distance of equal to or greater than the radius of the internal passage.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A flow control device adapted to be positioned in a wellbore, the flow control device comprising:
    a housing, the housing defining:
        a first internal passage, the first internal passage defining a first internal surface in the housing, the first internal passage and the first internal surface extending concentrically along a first axis, the first internal surface being spaced apart from the first axis by a first distance; and
        an internal recess defining a second internal surface in the housing, the second internal surface extending concentrically along the first axis and being spaced apart from the first axis by a second distance that is greater than the first distance; and
    a flapper valve extending within the first internal passage, the flapper valve comprising:
        a seat, the seat defining:
            a second internal passage extending concentrically along a second axis, the second internal passage being adapted to permit passage of a downhole tool therethrough; and
            an external surface mated with the first internal surface of the housing, the external surface extending concentrically along a third axis; and
        a flapper pivotably coupled to the seat;
    wherein the second axis is offset from the first axis and the third axis; and
    wherein the flapper valve is actuable to an open configuration in which at least a portion of the flapper extends within the internal recess defined by the housing.

2. The flow control device of claim 1,
    wherein the flapper is adapted to pivot away from the second axis by a distance of equal to or greater than a radius of the second internal passage when the flapper valve is in the open configuration, and
    wherein, when the flapper is pivoted away from the second axis by the distance of equal to or greater than the radius of the second internal passage, passage of the downhole tool through the second internal passage of the flapper valve is permitted.

3. The flow control device of claim 2,
    wherein the offset of the second axis from the first axis and the third axis provides space for the flapper to be pivoted away from the second axis by the distance of equal to or greater than the radius of the second internal passage.

4. The flow control device of claim 2,
    wherein the internal recess provides space for the flapper to be pivoted away from the second axis by the distance of equal to or greater than the radius of the second internal passage.

5. The flow control device of claim 2,
    wherein the flapper includes one or more tapered surfaces, and
    wherein the one or more tapered surfaces provide space for the flapper to be pivoted away from the second axis by the distance of equal to or greater than the radius of the second internal passage.

6. The flow control device of claim 1,
    wherein:
        one or more notches are formed in the seat and one or more internal protrusions are formed in the housing,
            wherein the one or more internal protrusions formed in the housing are configured to matingly engage the one or more notches formed in the seat to obstruct rotation of the seat within the first internal passage;
        and/or
        one or more notches are formed in the housing and one or more internal protrusions are formed in the seat,
            wherein the one or more internal protrusions formed in the seat being configured to matingly engage the one or more notches formed in the housing to obstruct rotation of the seat within the first internal passage.

7. A method, comprising:
    positioning a flow control device in a wellbore, the flow control device comprising:
        a housing, the housing defining:
            a first internal passage, the first internal passage defining a first internal surface in the housing, the first internal passage and the first internal surface extending concentrically along a first axis, the first internal surface being spaced apart from the first axis by a first distance; and an internal recess defining a second internal surface in the housing, the second internal surface extending concentrically along the first axis and being spaced apart from the first axis by a second distance that is greater than the first distance; and a flapper valve extending within the first internal passage, the flapper valve comprising:

a seat, the seat defining:

a second internal passage extending concentrically along a second axis; and an external surface mated with the first internal surface of the housing, the external surface extending concentrically along a third axis; and a flapper pivotably coupled to the seat;

pivoting the flapper valve to an open configuration in which at least a portion of the flapper extends within the internal recess defined by the housing; and passing a downhole tool through the second internal passage defined by the seat when the flapper valve is in the open configuration;

wherein the second longitudinal central axis is offset from the first axis and the third axis.

8. The method of claim 7, wherein the flapper is adapted to be pivoted away from the second axis by a distance of equal to or greater than a radius of the second internal passage when the flapper valve is in the open configuration, and wherein, when the flapper is pivoted away from the second axis by the distance of equal to or greater than the radius of the second internal passage, movement of the downhole tool through the flapper valve is permitted.

9. The method of claim 8, wherein the offset of the second axis from the first axis and the third axis provides space for the flapper to be pivoted away from the second axis by the distance of equal to or greater than the radius of the second internal passage.

10. The method of claim 8, wherein the internal annular recess provides space for the flapper to be pivoted away from the second axis by the distance of equal to or greater than the radius of the second internal passage.

11. The method of claim 8, wherein the flapper includes one or more tapered surfaces, and wherein the one or more tapered surfaces provide space for the flapper to be pivoted away from the second axis by the distance of equal to or greater than the radius of the second internal passage.

12. A flapper valve, comprising:

a seat defining an internal passage extending concentrically along a first axis, wherein the seat includes one or more external surfaces, wherein at least one of the one or more external surfaces extends concentrically along a second axis, wherein the second axis is offset from the first axis, wherein the seat further includes an internal tapered surface adapted to guide a downhole tool into the internal passage, and wherein the internal tapered surface extends concentrically along the second axis; and a flapper pivotably coupled to the seat.

13. The flapper valve of claim 12, wherein the flapper valve is actuable to:

an open configuration, in which the flapper valve permits fluid flow through the internal passage.

14. The flapper valve of claim 13, wherein the flapper is adapted to be pivoted away from the first axis by a distance of equal to or greater than a radius of the internal passage when the flapper valve is in the open configuration, and wherein, when the flapper is pivoted away from the first axis by the distance of equal to or greater than the radius of the internal passage, movement of the downhole tool through the flapper valve is permitted.

15. The flapper valve of claim 14, wherein the offset of the first axis from the second axis provides space for the flapper to be pivoted away from the first axis by the distance of equal to or greater than the radius of the internal passage.

16. The flapper valve of claim 14, wherein the flapper includes one or more tapered surfaces, and wherein the one or more tapered surfaces provide space for the flapper to be pivoted away from the first axis by the distance of equal to or greater than the radius of the internal passage.

* * * * *

UNITED STATES PATENT AND TRADEMARK OFFICE
CERTIFICATE OF CORRECTION

Page 1 of 1

PATENT NO. : 11,041,359 B2
APPLICATION NO. : 16/382871
DATED : June 22, 2021
INVENTOR(S) : William David Henderson It is certified that error appears in the above-identified patent and that said Letters Patent is hereby corrected as shown below:

In the Claims

Column 11, Line 25, delete "longitudinal central"

Column 11, Line 44, delete "annular"

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*